US006843140B2

(12) United States Patent
Osselmann et al.

(10) Patent No.: US 6,843,140 B2
(45) Date of Patent: Jan. 18, 2005

(54) SAFETY MODULE FOR A MULTIFUNCTIONAL HANDHELD TOOL

(75) Inventors: Claus Osselmann, Kaltenberg (DE); Stefan Groer, Graben (DE); Peter Hellmann, Obermeitingen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/643,231

(22) Filed: Aug. 18, 2003

(65) Prior Publication Data

US 2004/0104034 A1 Jun. 3, 2004

(30) Foreign Application Priority Data

Aug. 19, 2002 (DE) ........................................ 102 37 898

(51) Int. Cl.[7] ................................................ G01L 3/00

(52) U.S. Cl. .................................................. 73/862.08

(58) Field of Search ..................... 73/862.08; 244/17.19

(56) References Cited

U.S. PATENT DOCUMENTS 4,648,568 A * 3/1987 Phillips .................. 244/17.19
5,232,183 A * 8/1993 Rumberger ............. 244/17.19
5,798,622 A * 8/1998 Hirai et al. .................. 318/16

* cited by examiner

*Primary Examiner*—Max Noori
(74) *Attorney, Agent, or Firm*—Sidley Austin Brown & Wood, LLP

(57) ABSTRACT

A multifunction handheld tool machine having an at least partially axially percussive tool receptacle (7), a safety coupling (8) disposed in the power line between the tool receptacle and an electrical motor (6), a hand-guided housing and an ATC safety module (1) with a rotational sensor (3) sensitive to an angular displacement. The ATC safety module (1) is connected to an axial displacement sensor (4) and, in the event of exceeding an axial limit value (**13*b*), the binary control signal (5**) is suppressed by the axial displacement.

4 Claims, 1 Drawing Sheet

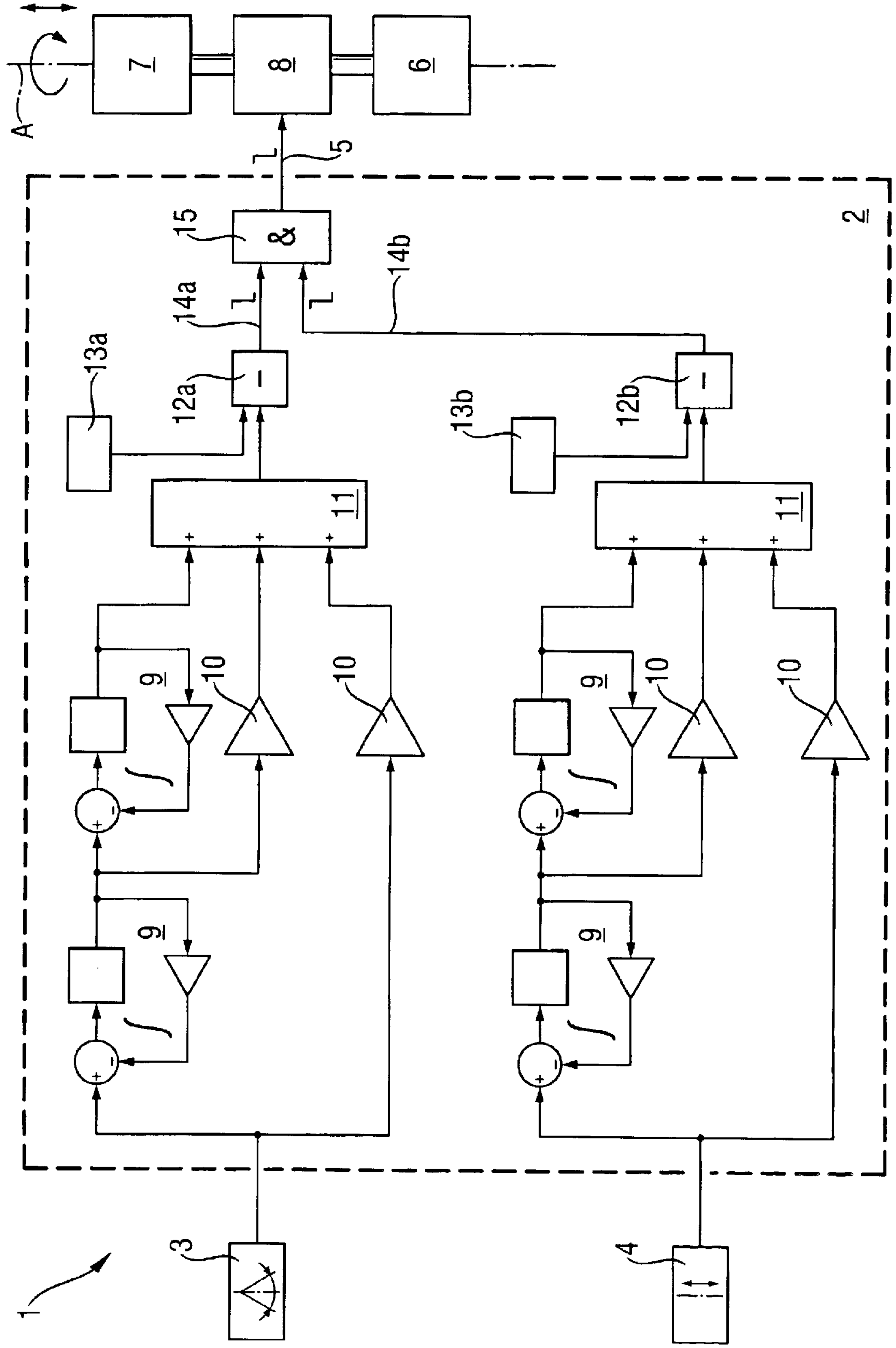
1
2
3
4
5
6
7
8
9
10
11
12a
12b
13a
13b
14a
14b
15
&
A

SAFETY MODULE FOR A MULTIFUNCTIONAL HANDHELD TOOL

BACKGROUND OF THE INVENTION

The invention relates to a safety module and a control process for a multifunctional handheld tool, in particular a hammer with chisel function.

In rotary handheld tools sometimes the tools jam in work piece resulting in an undesired rotation of the housing placing undesired rotation on the operator's hand. In order to prevent this effect, a variety of safety modules are utilized to reliably disconnect the power flow between the electrical motor and the tool in response to a rotational sensor signal based on, for example, the angular acceleration. In purely percussive modes of operation such as chiseling, on the other hand, strong movements of the housing such as slipping of the chisel occur and are acceptable. Disconnection of the power flow in such situations is undesired by the operator.

DE 19628945 A1 discloses a rotary handheld tool with an ATC safety module having a double integration of a rotary movement. The disclosure in this document helps those skilled in the art understand an ATC safety module.

DE 4334933 C discloses a rotary handheld tool for a rotating tool with an anti-torque control (ATC) safety module, which in the event of unacceptable rotations of the housing interrupts the drive train such that unacceptable spatial movements are detected by multi-axis acceleration sensors and evaluated by a fuzzy logic, which in acceptable rotations deactivates the ATC safety module. Different modes of operation are not picked up by the safety module.

DE 19942156 A1 discloses a rotary and percussive combination hammer with chiseling function having an ATC safety module with a rotary sensor sensitive to angular acceleration. In this case, the ATC safety module queries the operating modes of the combination hammer using a Hall sensor on the mode selection switch and the ATC safety module shuts down only in the exclusively percussive mode. The ATC safety module is particularly deactivated in the purely percussive chiseling mode and in the impact drilling mode or rotary drilling mode it is active. The actual mode does not follow directly upon setting the mode selection switch because of the switching delay, whereby the ATC safety module detects an incorrect mode in a brief interphase and is inactive in the protected mode in the case of rotary movement. This is a drawback especially when switching over from a still-running rotary mode to an exclusively percussive mode.

SUMMARY OF THE INVENTION

The object of the invention is to provide an ATC safety module that is constantly active in a protected mode for a multifunctional handheld tool.

This object is achieved in accordance with the invention by a multifunction handheld tool with an at least partially axially percussive tool receptacle and a manually guided housing having an ATC safety module with a rotation sensor sensitive to an angular displacement, wherein the ATC safety module is connected to an axial displacement sensor.

By virtue of the combination of the ATC safety module having the axial displacement sensor, the axial displacement sensor is also available to the ATC safety module such that an unprotected mode having large axial displacement is recognized directly by the ATC safety module.

In a control process associated with an ATC safety module, in the first step the determination of a rotary movement of the housing is determined, whereby in a second step in the event of exceeding a rotational limit value by the rotary displacement a binary control signal is produced, which in the last step reliably interrupts the power flow between the electrical motor and the tool, whereby in the first step, in addition, an axial displacement of the housing is detected, which in the second step, in the event of exceeding an axial limit value by the axial displacement, the axial displacement suppresses the binary control signal.

A continuously active ATC safety module in an actual exclusively percussion mode becomes ineffectual in the event of large axial displacements through the suppression of the control signal for interruption of the power flow.

Preferably, in a second step, a binary rotational control signal and a binary axial control signal are produced, which produce the binary control signal via a logical AND connection, whereby the two comparison operations can be separated from each other.

Preferably, the axial displacement detected is integrated twice in time, whereby a detected axial acceleration value is transformed into an axial path and is comparable with an axial amplitude as axial limit value.

BRIEF DESCRIPTION OF THE INVENTION

The advantageous exemplary embodiment of the invention will be described with reference the drawing wherein:

FIG. 1 shows a block diagram of the control process, in accordance with the invention.

DETAILED DESCRIPTION OF THE INVENTION

According to FIG. 1, a rotary and a percussive handheld tool machine can be combined relative to a tool axis A and has an ATC safety module 1. A control process (shown in FIG. 1) is produced as a control algorithm in a microcontroller 2, which at its input end is connected with a rotary displacement sensor 3, in the form of an angular acceleration sensor oriented relative to the tool axis A, and with an axial displacement sensor and at its output end produces a binary control signal 5 for controlling a safety coupling 8 disposed in the power flow between an electrical motor 6 and a tool receptacle 7. According to the block diagram, the detected rotary displacement or axial displacement is integrated in two stages in integrators 9 and in multipliers 10 multiplied by factors and finally added in an adder in a general second degree displacement equation each to a comparing element 12*a*, 12*b*, in which the are compared with a rotational limit value 13*a* or to an axial limit value 13*b*. A binary rotational control signal 14*a* of the comparing element 12*a* and a binary axial control signal 14*b* of the comparing element 12*b* are joined in a downstream AND member 15 to the binary control signal 5.

What is claimed is:

1. A multifunction handheld tool machine having an at least partially axially percussive tool receptacle (7), a safety coupling (8) disposed in a power line between the tool receptacle (7) and an electrical motor (6), a hand-guided housing and an ATC safety module (1) with a rotational sensor (3) sensitive to an angular displacement, wherein the ATC safety module (1) is connected to an axial displacement sensor (4).

2. A control process for an ATC safety module (1) of a multifunction handheld tool machine having an at least partially axially percussive tool receptacle (7), a safety coupling (8) disposed in a power line between the tool receptacle (7) and an electrical motor (6), a hand-guided housing, wherein the ATC safety module (1) has a rotational sensor (3) sensitive to an angular displacement and the ATC safety module (1) is connected to an axial displacement sensor (4), comprising, in a first step, a rotary displacement of the housing is detected, and in a second step, a binary control signal (5) is generated that upon exceeding a rotary limit value (12*a*) by virtue of the rotary displacement reliably interrupts the power flow between the electrical motor (6) and the tool receptacle (7), wherein in the first step, the axial displacement of the housing is detected and, in the second step, the binary control signal (5) upon exceeding an axial limit value (13*b*) is suppressed by the axial displacement.

3. The control process of claim 2, wherein in the second step, a binary rotational control signal (14*a*) and a binary axial control signal (14*b*) are generated that generate the binary control signal (5) over a logical AND connection.

4. The control process of claim 3, wherein the axial displacement detected in the first step is integrated twofold in time.

* * * * *